United States Patent
Markos

[11] Patent Number: 5,996,857
[45] Date of Patent: Dec. 7, 1999

[54] DISPENSING CONTAINER FOR POURABLE CONTENTS

[76] Inventor: Charles J. Markos, 1069 Club Pl., Atlanta, Ga. 30319

[21] Appl. No.: 08/980,700

[22] Filed: Nov. 25, 1997

[51] Int. Cl.[6] .............................. B67D 3/00; B65D 47/00
[52] U.S. Cl. ........................................... 222/531; 222/560
[58] Field of Search .................................... 222/531, 532, 222/560, 561

[56] References Cited

U.S. PATENT DOCUMENTS

| | | | |
|---|---|---|---|
| D. 35,473 | 12/1901 | McDonald et al. | 222/561 X |
| 2,002,125 | 5/1935 | Norris | 222/561 X |
| 2,139,116 | 12/1938 | Geist | 222/560 |
| 2,866,580 | 12/1958 | Nissen | 222/561 X |
| 2,969,167 | 1/1961 | Libit | 222/561 X |
| 3,409,186 | 11/1968 | Melocchi | 222/402.13 |
| 3,731,912 | 5/1973 | Kutzer | 266/38 |
| 4,057,167 | 11/1977 | Lee | 220/90.4 |
| 4,767,027 | 8/1988 | Lewiter et al. | 222/158 |
| 5,083,672 | 1/1992 | Lewandowski | 215/322 |
| 5,273,172 | 12/1993 | Rossbach et al. | 215/229 |
| 5,615,809 | 4/1997 | Feer et al. | 222/484 |

OTHER PUBLICATIONS

Spill Saver® ON/OFF FILLER, Flotool International, (1992).
NAPA Oil Valve, Balkemp, Inc. (undated).

*Primary Examiner*—Andres Kashnikow
*Assistant Examiner*—Sean P. O'Hanlon
*Attorney, Agent, or Firm*—Kennedy, Davis & Hodge

[57] ABSTRACT

An improved container providing improved spill control for the pouring of contents, such as fluids, into a receptacle, and in a preferred embodiment for pouring motor oil into an automobile engine, in which a moveable spout having a dispensing tube and a sealing plate is movable from a first position in which the sealing plate seals an opening to the container and a second position which aligns the dispensing tube with the opening for communicating the contents from the container to a receptacle, such as an automobile engine, the sealing plate being of a length sufficient to cover the opening for being sealed and remaining within a perimeter of the top surface when moved to the second position.

13 Claims, 3 Drawing Sheets

DISPENSING CONTAINER FOR POURABLE CONTENTS

TECHNICAL FIELD

The present invention relates generally to containers for holding pourable contents, such as fluids, for dispensing into receptacles. More particularly, the present invention relates to dispensing containers which reduce spillage of the contents being dispensed from the containers into the receptacles.

BACKGROUND OF THE INVENTION

Automobiles, airplanes, motor-powered water craft, ski-mobiles, lawn mowers, and other such motor devices, typically use one or more of a variety of fluids, including such fluids as oil, transmission fluid, power steering fluid, and others. As these products are used or worn, the fluids are periodically replaced. Occasionally, the volume of the fluids in the motor vehicle decreases such as through use or leaks. The volume of fluid accordingly must be supplemented. Typically in automobiles, motor oil is more commonly replaced or supplemented than are these other fluids. Although the following discussion will use automobile engines as a general example, it will be understood that such example is representative of the full range of other motor-powered applications for which the invention is useful.

Such fluids when sold in the after-market are generally packaged in small quantities, such as individual one quart containers. Some containers are fiberboard cylinders having metal tops and bottoms. These containers require a separate spout having a piercing element to pierce the metal top and to communicate the fluid from the container to the engine. Other containers have since been developed. Typically these comprise plastic bottles having elongated necks and twist-off caps. The cap is removed from the bottle, the oil fill cap is removed from the engine's oil filler port and the oil is poured from the bottle through the filler port into the engine.

While these containers provide a convenient supply of such fluids, using the containers while replacing or supplementing the fluids in the engine commonly results in some spillage on the engine adjacent the filler port. Spillage usually occurs because of a number of factors, including the unfavorable design of present containers which containers must be open prior to inverting the container over the filler port. Also, the engine compartment is often crowded and it may be difficult to reach the location of the filler port. Spillage may also occur accidentally for a variety of reasons.

If the spilled oil is not promptly removed, adverse consequences can result. These include oil dripping onto the floor of a garage and creating a dirty slippery surface. Road grime from dust or dirt accumulates on engine parts that are coated with spilled oil. The oil burns off surfaces of an operating engine and produces smoke. There is also potential damage to electrical and other operating parts in the engine compartment which come in contact with spilled oil.

Aligning the opening of such bottles with the filler port of the engine as the bottle is being inverted and the fluid flow begins, is an awkward task which often results in at least some oil being spilled outside the filler port until the bottle is fully positioned over or in the filler port. Inaccessibility of the filler port also contributes to the potential for oil spillage. Lack of accessibility can be caused by the height of the vehicle, the location of the filler port on the engine, and the presence of other engine parts, which may interfere with access to the filler port.

In efforts to avoid spillage, various devices have been developed for use with these motor fluid containers. These devices include funnels, long flexible tubes, and valve mechanisms. One such device is an elongated rigid tube having a screw cap at one end. A valve is positioned within the tube. The tube rotates to move the valve relative to the cap from a closed position to an open position for communicating fluids from the container to the engine. Another add-on device has an elongated flexible tube extending from screw-on cap for attaching the device to a bottle. The cap includes a valve which rotates between a closed position and an open position. The elongated flexible tube allows the user to hold the bottle away from the fill port.

While these devices attach to the oil bottle and communicate oil from the bottle to the engine, there are drawbacks associated with their use. First, they are devices which are separate from the oil bottle. As such, they must be manufactured, shipped, stocked at retail and sold as separate component products. These factors and other issues of cost and complexity of use are disadvantageous to consumers. These types of market factors are important when compared to the relatively nominal sales price of many of such products with which the devices are used. Also such devices must be attached to the oil bottle prior to use and must be removed from the oil bottle after use. Some residual oil will remain in the device, which oil collects dirt and other contaminants. The next time the tube is used, the dirt and contaminants are communicated to the engine. Also spills may still occur when using these devices. Furthermore, these devices typically require the use of two hands for operation.

Accordingly, there remains a need in the art for improved containers for holding and dispensing contents which reduce spillage while dispensing the contents into receptacles. It is to the provision of such that the present invention is directed.

SUMMARY OF THE PRESENT INVENTION

The present invention solves the need in the art by providing an improved spill-control dispensing container for dispensing contents into receptacles, comprising a container body having a bottom and a perimeter sidewall extending therefrom to an upper end. The upper end has a top surface defining an opening into the body. A dispensing spout mounts to the top surface. The dispensing spout has an open-ended dispensing tube extending from a sealing plate that substantially conforms in shape to the top surface. The dispensing spout is moveable from a first position in which the sealing plate seals the opening in the top surface and a second position in which the tube is aligned with the opening for communicating contents from the body through the tube. With the tube in the first position, the body is inverted to a bottom-surface-up orientation and the tube inserted into a receiving inlet in a receptacle. To communicate at least a portion of the contents from the body through the fluid inlet into the receptacle, the body is moved in the first direction in order to move the tube to the second position relative to the body and thereby align the tube with the opening for dispensing contents from the body into the receptacle.

In a preferred embodiment, the dispensing spout mounts in the body to a pair of spaced-apart, parallel opposing ledges in opposing edge portions of the top surface. The ledges extend parallel to an axis in the portion in the first direction. Each of the ledges defines an elongate slot in a side wall of the ledge which faces the opposing ledge. The slots extend substantially the length of the ledges. The sealing plate has opposing side edges that are slidably received within the slots for moving the dispensing spout from the first position to the second position for communicating fluids from the body through the tube.

In an alternate embodiment, the dispensing spout mounts in a chimney defined by a pair of opposing side panels and a pair of opposing end panels. The side panels each define a bore in an upper portion adjacent an edge of the panel. The top surface of the chimney defines an arcuate track that extends between the opposing side panels. The sealing plate of the dispensing spout substantially conforms in shape to the arcuate track. The track defines an opening in a central portion into the body for communication therethrough. The end panels each define a stop flange which extends towards the opposite end panel to define a stop at respective distal ends of the arcuate track. A pair of pivot mounts extend laterally on opposing sides of the tube in the dispensing spout. The pivot mounts engage the bores in the side panels to pivotally connect the dispensing spout to the body. A lower sealing surface of the sealing plate is held in intimate sliding contact with the track when the pivot mounts engage the bores in the side panels. With the tube in the first position, the sealing plate seals the opening. The body is inverted to a bottom-surface-up orientation for inserting the tube into a receiving inlet in a receptacle. To communicate fluid from the body through the receiving inlet into the receptacle, the body is moved in the first direction in order to move the tube to the second position relative to the body, and align the tube with the opening in the track.

In another aspect, the present invention provides a method of dispensing contents, such as motor fluids, from a container into a receptacle, such as an engine, comprising the steps of inverting a container body to position a tube into a receiving inlet in a receptacle. The body has a bottom, a perimeter sidewall extending therefrom to an upper end having a top surface. In a preferred embodiment, a portion of the top surface is arcuate in at least a first direction and defines an opening into the body. A dispensing spout mounts to the top surface. The dispensing spout has a dispensing tube which extends from a sealing plate. The sealing plate substantially conforms in shape to the top surface to selectively seal the opening. The dispensing spout is moveable from a first position in which the sealing plate seals the opening in the top surface and a second position in which the tube aligns with the opening for communicating fluids from the body through the tube. The tube is inserted into a receiving inlet to the receptacle. The body is moved in the first direction to move the dispensing spout from the first position to the second position to align the tube with the opening for communicating fluid from the body through the receiving inlet into the receptacle.

Objects, features and advantages of the present invention will become apparent upon reading the following detailed description of the disclosed embodiment of the present invention, in conjunction with the appended drawings and claims.

DETAILED DESCRIPTION OF THE PREFERRED EMBODIMENTS

Figure 1:
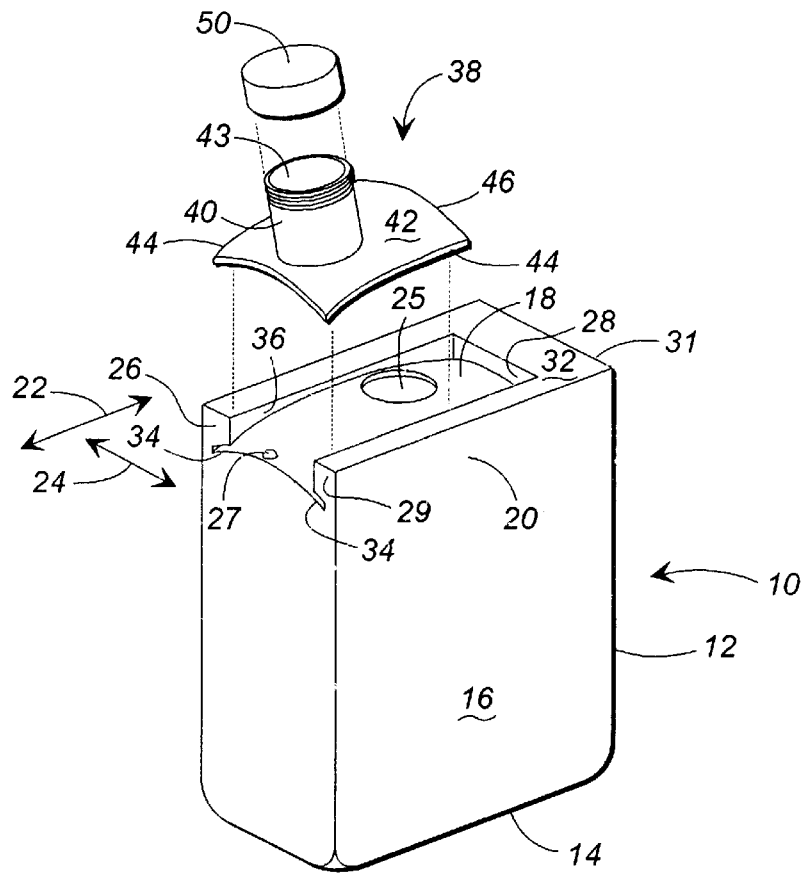
FIG. 1 is a perspective, partially cut-away view of a preferred embodiment of a dispensing container for pourable contents in accordance with the present invention.

Referring now in more detail to the drawings in which like parts have like identifiers, FIG. 1 is a perspective, partially cut-away view of a preferred embodiment of a dispensing container 10 for pourable contents in accordance with the present invention. The dispensing container 10 comprises a container body generally 12 having a bottom 14 and a perimeter sidewall 16 extending therefrom to an upper end 20 which defines a top surface 18. The upper end 20 preferably defines a bowl for communicating fluids from the body to the opening. The upper end 20 may have planar facets or be dome shaped. The top surface 18 defines a generally rectangular perimeter. In a preferred embodiment, the top surface 18 is convexly arcuate relative to the container body 12 in at least one direction, which could be a first direction 22 or a second direction 24 transverse to the first direction, or in the illustrated embodiment, convexedly arcuate in the first and second directions. The top surface 18 defines an opening 25 into the body 12 at an apex. A retainer tab 27 projects from the top surface 18 at one side, for a purpose discussed below.

The upper end 20 further includes a pair of spaced-apart, parallel opposing ledges 26 that extend between opposing first and second edges 29, 31, respectively, of the container 10. In the illustrated embodiment, the ledges 26 are disposed with a longitudinal axis parallel to the first direction 22. A stop plate 28 is transverse to the ledges 26 and integrally joined to each ledge. The ledges 26 and the stop plate 28 define a common planar surface 32. In an alternate embodiment (not illustrated), the common planer surface 32 defines a shape arcuate in a first direction similar to the top surface 18. In yet another embodiment (not illustrated) the stop plate 28 is eliminated and the top surface 18 includes a second retainer tab on a side of the top surface 18 opposite the retainer tab 27. This second retainer tab projects outwardly for the purpose of functioning as a stop, as discussed below. In yet another alternate embodiment (not illustrated) the elongate slots 34 do not extend to the edges 29, 31 and thereby define stops at the respective ends of the slots in the ledges 26. The travel of a dispensing spout 38 along the slots is restricted by the stops when the spout is moved between the first position and the second position, as discussed below.

The ledges 26 each define an elongate slot 34 in a respective side wall 36 of the ledge which faces the opposing ledge 26. The slots 34 in the illustrated embodiment extend substantially the length of the ledges from the first edge 29 to the stop plate 28. The slots 34 are substantially parallel to the arcuate surface in the top surface 18, so as to have a common curvature.

Figure 2:
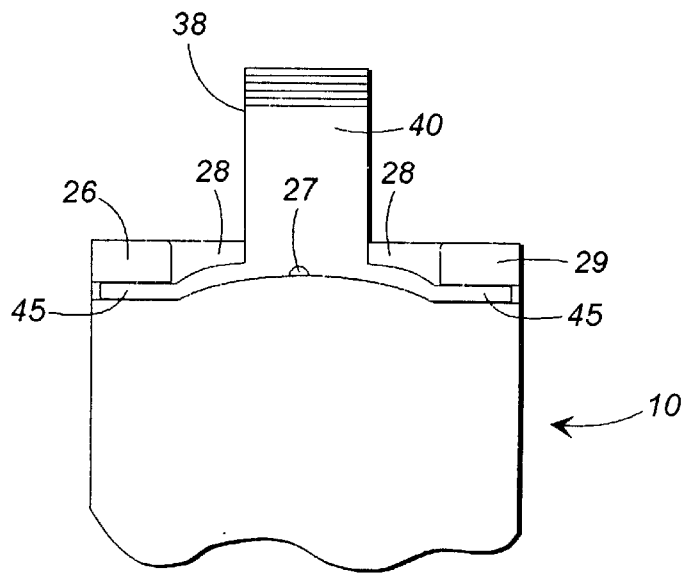
FIG. 2 is an end view of the dispensing container of FIG. 1, to illustrate an alternate embodiment of the dispensing spout, in accordance with the present invention.

The dispensing spout 38 is illustrated exploded from the body 12. The dispensing spout 38 selectively seals the opening 25 and communicates contents from the body 12, as discussed below. The dispensing spout 38 has an open-ended dispensing tube 40 that extends from a sealing plate 42 to an open distal end 43. The tube 40 communicates the contents from the body 12. The sealing plate 42 substantially conforms in cross-sectional shape to the top surface 18. In the illustrated embodiment the sealing plate 42 is arcuate. The sealing plate 42 has opposing side edges 44 that are slidably received within the slots 34, as discussed below. FIG. 2 is an end view of an upper portion of the body 12, illustrating an alternate embodiment of the dispensing spout 38, in which edge portions 45 are disposed at an angle relative to the top surface 18 rather than extending collinear with the arcuate surface. In this embodiment, a portion of the sealing plate 42 substantially conforms in shape to the top surface 18. It is noted that in this embodiment the elongated slots likewise extend at the angle.

The dispensing spout 38 is movable from a first position to a second position. In the first position, the sealing plate 42 seals the opening 25 in the top surface 18. The sealing plate 42 accordingly is of a length sufficient to cover the opening 25 when the dispensing spout 38 is in the first position. In the second position, the tube 40 is aligned with the opening 25 for communicating fluids from the body 12 through the tube. An edge 46 of the sealing plate 42 bears against an inner side wall of the stop plate 28 when the dispensing spout 38 is in the second position. In the illustrated embodiment, a cap 50 closes the distal end 43 of the tube 40. The distal end 43 and the cap 50 can be threaded (as illustrated) or can have closely-sized diameters for force-fitting the cap to the tube.

In a preferred embodiment, the body 12 and the dispensing spout 38 are molded of flexible plastics. The dispensing spout 38 is engaged to the body 12 by inserting the side edges 44 of the sealing plate 42 into the slots 34. In so doing, the sealing plate 42 is forced over the retainer tab 27, which preferably possesses only the minimal dimensions necessary to perform a stopping function, as discussed below. The retainer tab 27 preferably defines a wedge-shaped projection with a tapered leading edge towards the edge 29 and a planar wall facing towards the opening 25, for stopping the sealing plate 42. The dispensing spout 38 is then moved along the slots 34 to align the tube 40 with the opening 25 for filling the body 12 with contents to be held and dispensed subsequently into a receptacle, for example fluids into an engine. Alternatively, the body 12 could be first filled, and the dispensing spout 38 engaged thereafter. The filled container 10 is then closed by moving the dispensing spout 38 to the first position in which the sealing plate 42 seals the opening 25. The retainer tab 27 restricts the sealing plate 42 from sliding out of the slots 34 and off of the body 12.

Figure 3:
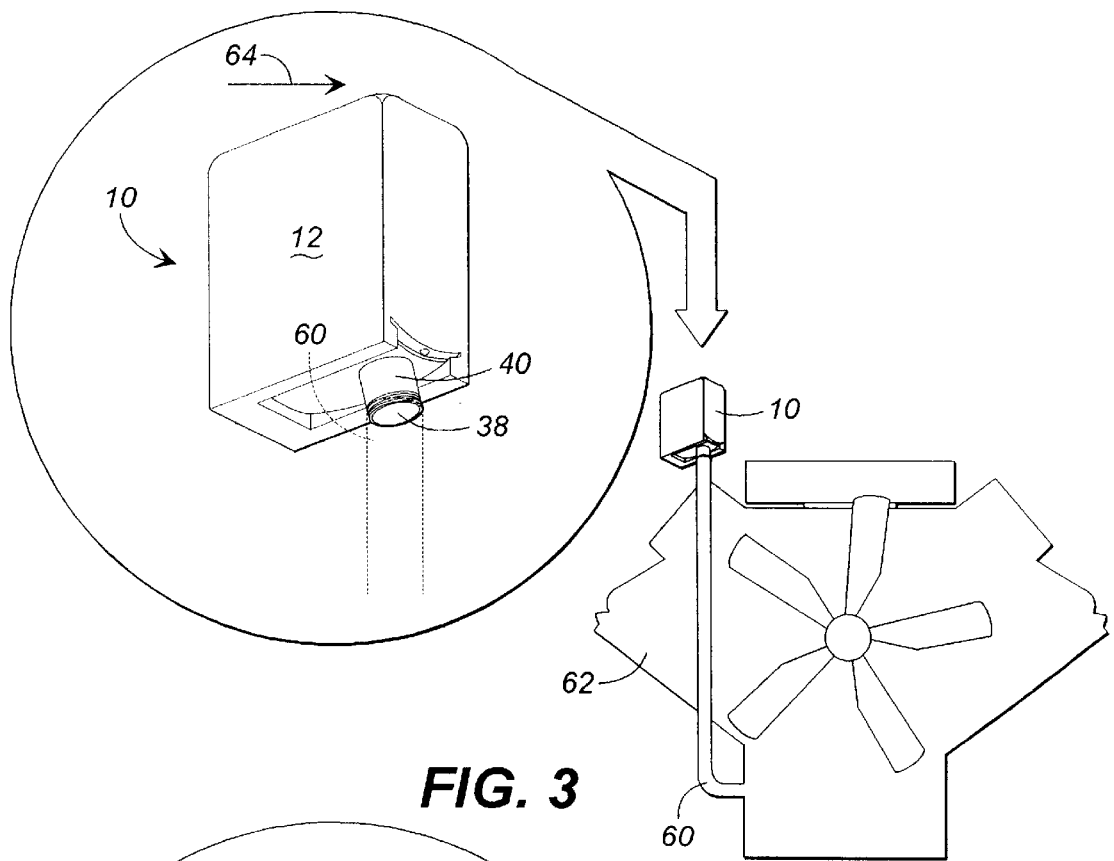
FIGS. 3 and 4 are perspective views of the dispensing container illustrated in FIG. 1 positioned for dispensing fluid from the container into an engine of a motor vehicle.
Figure 4:
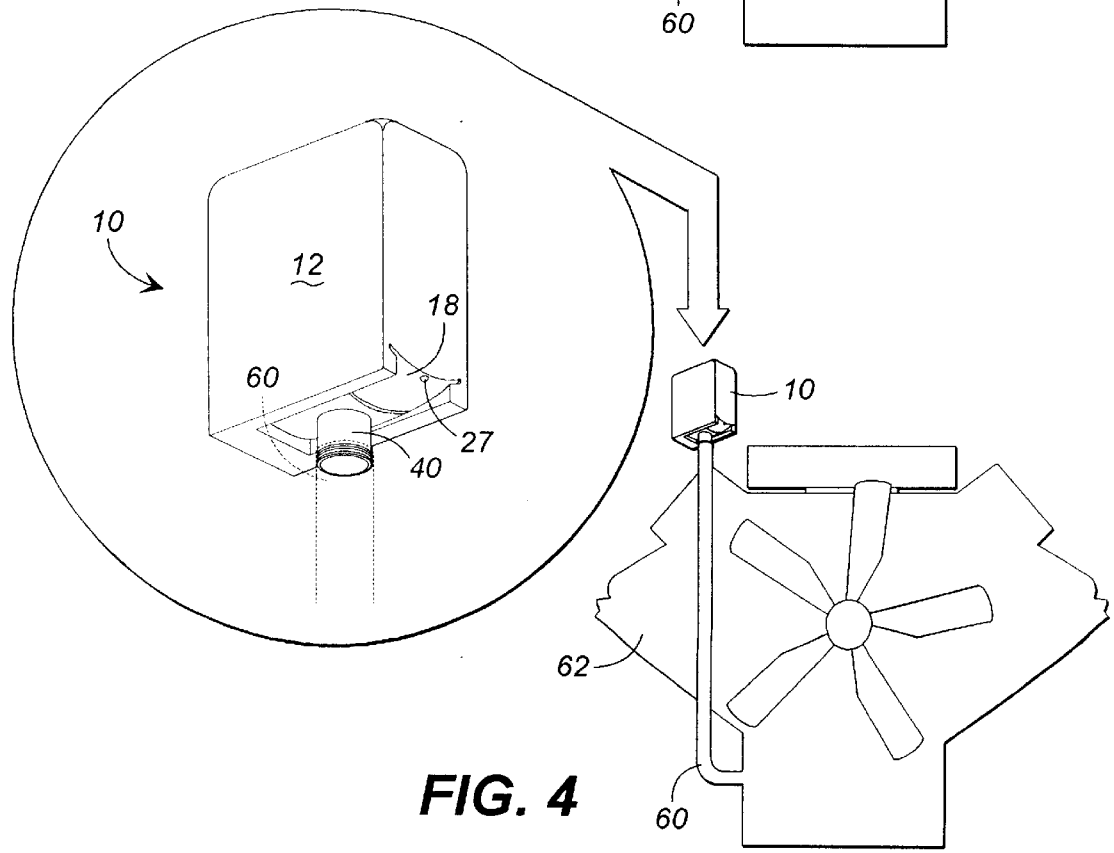

The container 10 of the present invention is useful for holding and dispensing pourable contents from the container into receptacles, with improved spill prevention. A common example to which the container 10 is preferably employed is for holding and dispensing motor oil into an engine, and such example will continue to be used for illustration purposes. And although the disclosed use in this example is for holding and dispensing fluids, it is contemplated that the pourable contents may also be solids including powdered and granular materials. FIGS. 3 and 4 are perspective views of the container 10 being used for dispensing fluid, such as motor vehicle oil, into a fluid inlet 60 of an engine 62. This is accomplished by placing the dispensing spout 38 in the first position for sealing the opening 25 in the body 12. The cap 50 (if used) is removed, and as shown in FIG. 3, the container 10 is then inverted and the tube 40 is inserted into the fluid inlet 60. The tube 40 is then aligned with the opening 25 to communicate the fluid from the body 12 into the motor. This is accomplished by grasping and pushing the body 12, as indicated by the arrow 64. The tube 40 bears against the inner surface of the fluid inlet 60. As illustrated in FIG. 4, the body 12 slidingly moves relative to the tube 40, which thereby aligns the tube with the opening 25. The edge 46 bears against the inner side wall of the stop plate 28 which stops the movement of the dispensing spout 38 with the tube 40 aligned with the opening 25. The tube 40 then communicates fluid from the body 12 through the fluid inlet 60 into the motor 62. The bowl defined by the top surface 18 facilitates draining the fluid from the body 12.

After delivery of the fluid, the container 10 is removed. The body 12 is grasped and pushed in an opposite direction in order to move the dispensing spout 38 to the first position. The flow of fluid is stopped by the sealing action of the sealing plate 42. The body is then moved to extract the tube 40 from the filler inlet 60.

In an alternate embodiment (not illustrated), the top surface 18 defines a projecting detent for holding the sealing plate 42 in the first position. The sealing plate also includes a recess defined in a lower surface thereof, for engaging the projecting detent in the top surface of the body.

Figure 5:
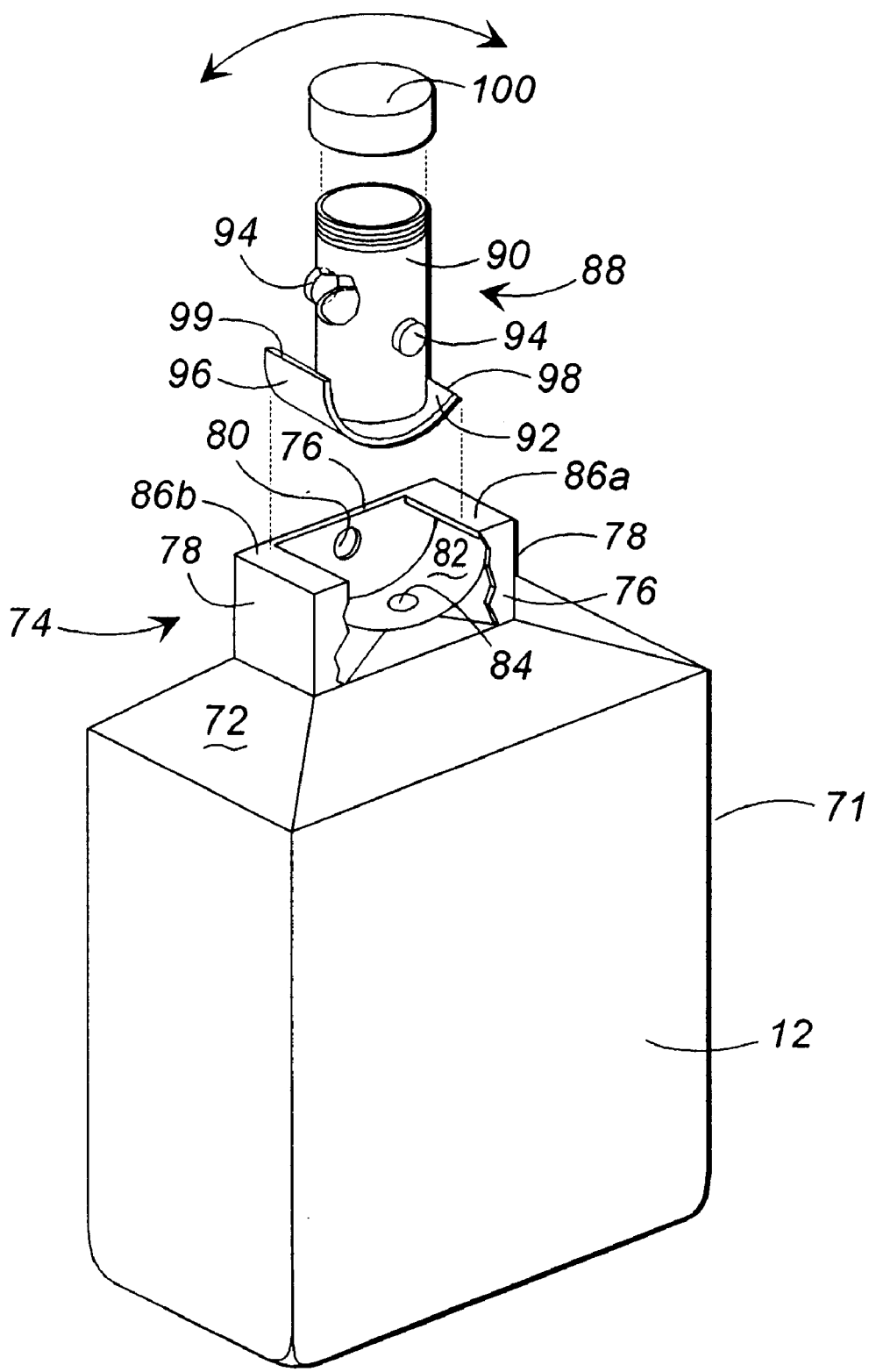
FIG. 5 is a perspective, partially cut-away view of an alternate embodiment of a dispensing container for pourable contents in accordance with the present invention.

FIG. 5 is a perspective, partially cut-away view of an alternate embodiment of a dispensing container 71 for pourable contents in accordance with the present invention. The body 12 has an upper end 72 from which a mounting chimney 74 extends. The upper end 72 defines a bowl for communicating contents from the body to an opening 84 in an upper portion of the container 71. In the illustrated embodiment, the upper end 72 is defined by a plurality of interconnected planar facets. In another embodiment, the upper end 72 is defined by a bowl-shaped dome. The mounting chimney 74 is defined by a pair of opposing side panels 76 and a pair of opposing end panels 78. The opposing side panels 76 each define a bore 80 in an upper portion adjacent an edge. In the illustrated embodiment, the bores extend through the side panels. In an alternate embodiment, the bores extend only a portion of the thickness of the side panels.

A top surface of the chimney 74 is defined by an arcuate track 82 extending between the opposing side panels 76. The track 82 is concavedly bowed with a central low portion towards the body 12 and a pair of distal ends adjacent the end panels 78. The ends are distally away from the body 12 relative to the low portion of the track. The track 82 defines the opening 84 in the central low portion to the body 12 for communicating fluids. A stop flange 86a, 86b extends laterally from an inner face of each of the end panels 78. The stop flanges 86 extend towards the opposing end panel 78 and define a stop at the respective distal ends of the arcuate track 82.

A dispensing spout 88 is received by the chimney 74 for selectively sealing the opening 84 and communicating fluid through the opening into and out of the body 12. The dispensing spout 88 has an open-ended dispensing tube 90 which extends from a portion of a sealing plate 92 that substantially conforms in shape to the arcuate track 82. The tube 90 is disposed preferably off-center on the sealing plate 92. A pair of pivot mounts 94 extend laterally on opposing sides of the dispensing tube 92. As discussed below, the pivot mounts 94 engage the bores 80 in the opposing side panels 76 for pivotably mounting the dispensing spout 88 in the mounting chimney 74. In an alternate embodiment (not illustrated), the pivot mounts 94 comprise pins, which extend through the bores 80 into the tube 90. The sealing plate 92 has a lower sealing surface 96 which is in intimate sliding contact with the track 82 when the pivot mounts 94 engage the bores 80. The sealing plate 92 has first edge 98 and a second edge 99. The first edge 98 bears against a first one of the stop flanges 86a when the dispensing spout 88 is in the first position. The second edge 99 bears against the second one of the stop flanges 86b when the dispensing spout 88 is in the second position.

The dispensing spout 88 is pivotable in the chimney 74 from a first position in which the sealing plate 92 seals the opening 84 in the top surface or track 82 and a second position in which the tube 90 is aligned with the opening 84 for communicating the contents from the body 12 through the tube. The sealing plate 92 is of a length sufficient to cover the opening 84 when the dispensing spout 88 is in the first position.

In an alternate embodiment (not illustrated), the chimney 74 is replaced with a single-side panel extending from the upper end. The dispensing spout 88 includes one pivot mount 94 extending laterally on a side of the dispensing tube 90. The pivot mount engages a bore in the panel. This embodiment accordingly eliminates the end panels and the second side panel. The respective distal ends of the arcuate track each define a stop flange that extends towards the opposite distal end in order to perform the stopping function for the sealing plate 92.

The container 71 is used by attaching the dispensing spout 88 to the body 12. The pivot mounts 94 snap into the bores 80 in the opposing side panels 76. The dispensing tube 90 is aligned with the opening 84 for filling the body 12, such as with a fluid. Alternatively, the body 12 could be filled with fluid first, and the dispensing spout 88 attached thereafter. The dispensing tube 90 is then moved to the first position by pivoting the tube relative to the body 12. The stop flange 86a stops the dispensing spout 88 with the sealing plate 92 sealing the opening 84 in the body 12. It is to be appreciated that the distal edges of the end panel 78 or the opposing side panel 76 may include a flange projecting towards the opposing panel, which flange would function to stop the pivoting of the dispensing spout 88 when the sealing plate 92 contacts the flanges.

In the illustrated embodiment, a cap 100 closes a distal end of the dispensing tube 90. In the illustrated embodiment, the cap 100 and the dispensing tube 90 are threaded for engagement of the cap. In another embodiment, the diameters are closely sized for force-fitting the cap 100 to the dispensing tube 90.

To dispense fluids from the container 71 into the engine, the cap 100 (if used) is removed, the body 12 is inverted and the dispensing tube 90 inserted into the fluid inlet of the engine. The body 12 is grasped, and forcibly pushed laterally. The dispensing tube 90 bears against an inner surface of the fluid inlet. This causes the tube 90 to move relative to the body from the first position to the second position with the tube aligned with the opening 84. Fluids from the body 12 communicate through the tube 90 to the engine. After the body 12 is empty, or a selected volume of the fluids is dispensed, the body 12 is grasped and moved in a second opposite direction. The tube 90 bears against an opposite side of the fluid inlet of the engine, and is thereby caused to move relative the body 12 to the first position. The container 71 is then removed from the fluid inlet of the engine.

The present invention accordingly provides a convenient and economical container holding pourable contents such as fluids and having a selectable seal and communication tube for positioning the container in an inlet of a receptacle, such as an engine, and selectively communicating the fluids from the container into the engine, whereby spillage of the fluids is avoided.

The principles, preferred embodiments and modes of operation of the present invention have been described in the foregoing specification. The invention is not to be construed as limited to the particular forms disclosed because these are regarded as illustrative, rather than restrictive. Moreover, variations and changes may be made by those skilled in the art without departing from the spirit of the invention as described by the following claims.

What is claimed is:

1. A dispensing container for holding and dispensing contents into a receptacle, comprising:
    a container body for holding contents, having a bottom, a perimeter sidewall extending therefrom, and an upper end having a top surface defining an opening into the body, and means for mounting a dispensing spout to said top surface; and
    said dispensing spout having an open-ended dispensing tube extending from a sealing plate that substantially conforms in shape to the top surface, said dispensing spout moveable in said mounting means in a first direction from a first position in which said sealing plate seals said opening in said top surface to a second position in which said tube is aligned with said opening for communicating at least a portion of the contents from said body through said tube, said sealing plate is of a length sufficient to cover said opening when said dispensing spout is in said first position and remaining within a perimeter defined by the top surface in said second position
    whereby said tube, being in said first position and said body being inverted to a bottom-surface-up orientation with said tube being inserted into a receiving inlet in a receptacle, communicates contents from said body through said receiving inlet into said receptacle upon gripping said body and bearing forcibly in said first direction to move said tube to the second position relative to said body and thereby align said tube with said opening for dispensing contents from said body into said receptacle, with the sealing plate remaining within the perimeter of the top surface.

2. The dispensing container as recited in claim 1, further comprising at least one projection in the top surface for bearing against a first edge of said sealing plate when said dispensing spout is moved to the first position relative to the body.

3. The dispensing container as recited in claim 1, wherein the top surface is arcuate in at least a first direction.

4. The dispensing container as recited in claim 3, wherein the opening is at an apex of the top surface.

5. The dispensing container as recited in claim 1, wherein said mounting means comprises:
    a pair of spaced-apart, parallel opposing ledges defined in opposing edge portions of said top surface and extending parallel to an axis therein in said first direction, each of said ledges defining an elongate slot in a side wall of said ledge facing the opposing ledge, said slots extending substantially the length of the ledges; and
    said sealing plate having opposing side edges slidably received within the slots,
    said dispensing spout movable from a first position in which said sealing plate seals said opening in said top surface and a second position in which said tube is aligned with said opening for communicating contents from said body through said tube.

6. The dispensing container as recited in claim 1, wherein said mounting means comprises:
    a mounting chimney defined by a pair of opposing side panels and a pair of opposing end panels extending from said top surface, said opposing side panels each defining a bore in an upper portion adjacent an edge thereof, said top surface of the chimney defining an arcuate track extending between said opposing side panels, said end panels each defining a stop flange which extends towards the opposite end panel to define a stop at respective distal ends of said arcuate track; and said sealing plate substantially conforms in shape to the arcuate track and having a lower sealing surface in intimate sliding contact with said track, said sealing plate is of a length sufficient to cover said opening when said dispensing spout is in said first position and said sealing plate has a first edge and a second edge, said first edge bearing against a first one of the stop flange of one of the panels when said dispensing spout is in said second position and said second edge bearing against said stop flange of said other one of the end panels when said dispensing spout in said first position; and a pair of pivot mounts extending laterally on opposing sides of said tube which engage said bores in said opposing side panels for pivotably mounting said dispensing spout in said mounting chimney, whereby said tube, being in said first position with said sealing plate sealing said opening and said body being inverted to a bottom-surface-up orientation with said tube being inserted into a receiving inlet in a receptacle, communicates contents from said body through said receiving inlet into said receptacle upon gripping said body and forcibly bearing on same in said first direction to move said tube to the second position relative to the body.

7. A dispensing container for holding and dispensing contents into receptacles, comprising:

a container body for holding contents, having a bottom, a perimeter sidewall extending therefrom to an upper end that defines a non-planar top surface, and a mounting chimney defined by a pair of opposing side panels and a pair of opposing end panels extending from said top surface, said opposing side panels each defining a bore in an upper portion adjacent an edge thereof, said top surface of the chimney defining an arcuate track extending between said opposing side panels and defining an opening in a central portion thereof into said body, said end panels each defining a stop flange which extends towards the opposite end panel to define a stop at respective distal ends of said arcuate track; and a dispensing spout having an open-ended dispensing tube extending from a sealing plate that substantially conforms in shape to the arcuate track, a pair of pivot mounts on opposing sides of said tube which pivot mounts engage said bores in said opposing side panels for pivotably mounting said dispensing spout in said mounting chimney, said sealing plate having a lower sealing surface in intimate sliding contact with said track when said pivot mounts engage said bores, said dispensing tube pivotable therein from a first position in which said sealing plate seals said opening in said top surface and a second position in which said tube is aligned with said opening for communicating contents from said body through said tube, said sealing plate is of a length sufficient to cover said opening when said dispensing spout is in said first position and said sealing plate has a first edge and a second edge, said first edge bearing against a first one of the stop flange of one of the panels when said dispensing spout is in said second position and said second edge bearing against said stop flange of said other one of the end panels when said dispensing spout in said first position, whereby said tube, being in said first position and said body being inverted to a bottom-surface-up orientation with said tube being inserted into a receiving inlet in a receptacle and with said sealing surface sealing said opening, communicates contents from said body through said receiving inlet into said receptacle upon gripping said body and bearing forcibly thereon in said first direction to pivot said tube to said second position relative to said body and thereby align said tube with said opening for dispensing contents from said body into said receptacle.

8. The dispensing container as recited in claim 7, wherein said upper end is defined by a plurality of adjacent facets that cooperatively define a bowl for communicating contents from said body to said opening.

9. The dispensing container as recited in claim 7, wherein said upper end is defined by a bowl-shaped dome for communicating contents from said body to said opening.

10. A dispensing container for holding and dispensing contents into receptacles, comprising:

a container body for holding contents, having a bottom, a perimeter sidewall extending therefrom to an upper end having a top surface, said top surface defining an opening into the body, a pair of spaced-apart, parallel opposing ledges extending from opposing edge portions of said top surface and parallel to an axis in said first direction thereof, and a stop plate transverse to the ledges integrally joined to a respective end of each ledge, each of said ledges further defining an elongate slot in a respective side wall of said ledge facing the opposing ledge, said slots extending substantially the length of the ledges; and a dispensing spout having an open-ended dispensing tube extending from a sealing plate that substantially conforms in shape to the top surface, said sealing plate having opposing side edges slidably received within the slots, and movable from a first position in which said sealing plate seals said opening in said top surface and a second position in which said tube is aligned with said opening for communicating contents from said body through said tube, said sealing plate is of a length sufficient to cover said opening when said dispensing spout is in said first position, and a first edge of said sealing plate bears against an inner side wall of said stop plate when said dispensing spout is in said second position, whereby said tube, being in said first position and said body being inverted to a bottom-surface-up orientation with said tube being inserted into a receiving inlet in a receptacle, communicates fluid from said body through said receiving inlet into said receptacle upon gripping said body and moving same to move said tube to the second position relative to the body.

11. The dispensing container as recited in claim 10, wherein the top surface is arcuate in a first direction and arcuate in a second direction transverse to said first direction.

12. The dispensing container as recited in claim 10, wherein said top surface further defines a retainer tab for stopping said sealing plate when moved to said first position by bearing against a first edge of said sealing plate.

13. A method of dispensing contents from a container through a receiving inlet into a receptacle, comprising the steps of:

(a) inverting a container body holding contents and having a bottom, a perimeter sidewall extending therefrom, and an upper end having a non-planar top surface which has a portion being arcuate in at least a first outwardly direction, said top surface defining an opening into the body, and means for mounting a dispensing spout to said top surface, said dispensing spout having an open-ended dispensing tube extending from a sealing plate that substantially conforms in shape to said top surface, said dispensing spout moveable in said mounting means from a first position in which said sealing plate seals said opening in said top surface and a second position in which said tube is aligned with said opening for communicating contents from said body through said tube;

(b) inserting said tube into said receiving inlet to said receptacle;

(c) moving said body forcibly in a first direction to move said dispensing spout from said first position to said second position, whereby said tube, being moved to said second position, aligns with said opening and communicates contents from said body through said receiving inlet into said receptacle.

* * * * *